United States Patent
Siram et al.

(10) Patent No.: US 11,354,105 B2
(45) Date of Patent: Jun. 7, 2022

(54) MODEL DRIVEN SYSTEM AND METHOD FOR DEVELOPMENT OF MICRO SERVICE APPLICATIONS

(71) Applicant: Tata Consultancy Services Limited, Mumbai (IN)

(72) Inventors: Subbarao Siram, Hyderabad (IN); Ashutosh Damodar Sabde, Thane (IN); Yugesh Avadhanula, Hyderabad (IN); Jyoti Joshi, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/119,951

(22) Filed: Dec. 11, 2020

(65) Prior Publication Data

US 2021/0216293 A1    Jul. 15, 2021

(30) Foreign Application Priority Data

Dec. 13, 2019  (IN) .............................. 201921051887

(51) Int. Cl.
| | |
|---|---|
| *G06F 9/44* | (2018.01) |
| *G06F 8/60* | (2018.01) |
| *G06F 8/35* | (2018.01) |
| *G06F 8/41* | (2018.01) |
| *G06F 8/71* | (2018.01) |

(52) U.S. Cl.
CPC .................. *G06F 8/60* (2013.01); *G06F 8/35* (2013.01); *G06F 8/43* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 8,726,229 | B2 * | 5/2014 | Brunswig | G06F 8/40 717/139 |
| 10,230,571 | B2 * | 3/2019 | Rangasamy | H04L 41/0803 |
| 10,521,199 | B2 | 12/2019 | Ganesan et al. | |

(Continued)

FOREIGN PATENT DOCUMENTS

CN          106533929 A        3/2017

*Primary Examiner* — Wei Y Zhen
*Assistant Examiner* — Lanny N Ung
(74) *Attorney, Agent, or Firm* — Finnegan, Henderson, Farabow, Garrett & Dunner, LLP

(57) ABSTRACT

Conventional methods for application development are rigid, complex, costly and ineffective in implementing new and changing technologies. The embodiments herein provide a model driven system and method for development of micro service applications. A set of user interface components and one or more domain components for a plurality of micro services designs of a plurality of applications pertaining to one or more technologies are modeled and validated. Further, a plurality of codes are generated according to the one or more modeled domain components of the plurality of micro services designs of the plurality of applications satisfying one or more requirements. The plurality of generated codes are further customized and validated to ensure design and code consistency. The plurality of customized codes are further containerized to provide a plurality of containerized applications which are deployed into a target deployment environment for execution using a plurality of configuration files.

9 Claims, 3 Drawing Sheets

(56) References Cited

U.S. PATENT DOCUMENTS

| | | |
|---|---|---|
| 10,545,738 B1* | 1/2020 | Jaeger .................... G06F 8/36 |
| 2011/0126118 A1* | 5/2011 | Bergeron ............... G06F 9/451 |
| | | 715/744 |
| 2016/0124742 A1 | 5/2016 | Rangasamy et al. |
| 2017/0187785 A1* | 6/2017 | Johnson ................. H04L 67/10 |
| 2017/0262264 A1 | 9/2017 | Ganesan et al. |
| 2018/0088935 A1 | 3/2018 | Church et al. |
| 2018/0165070 A1* | 6/2018 | Kham .................... G06F 8/35 |

* cited by examiner

MODEL DRIVEN SYSTEM AND METHOD FOR DEVELOPMENT OF MICRO SERVICE APPLICATIONS

PRIORITY CLAIM

This U.S. patent application claims priority under 35 U.S.C. § 119 to: India Application No. 201921051887, filed on Dec. 13, 2019. The entire contents of the aforementioned application are incorporated herein by reference.

TECHNICAL FIELD

The disclosure herein generally relates to micro service applications and more particularly, to a model driven system and method for development of micro service applications.

BACKGROUND

With advancement of software technologies, enterprises seek large scale software applications to improve business processes and agility. However, development of the large scale software applications is complex, and a time-consuming activity with multiple processes. Further, optimization of development process is necessary to reduce development cost and overcome delays in setting up the software applications. Conventionally, a model was created for software applications of an enterprise. The generated model was further used for a model-based application testing.

Further, conventional systems utilizing legacy application are rigid, involve huge maintenance cost, and are unable to cater features that latest digital technologies offer. Furthermore, with conventional systems, it is challenging to modernize application landscape of organizations to enable faster and effective implementation of new technologies such as internet of things (IoT), cloud, mobility, micro services, Big Data and social media to keep up with latest market trends.

SUMMARY

Embodiments of the present disclosure present technological improvements as solutions to one or more of the above-mentioned technical problems recognized by the inventors in conventional systems. For example, in one aspect, there is provided a processor implemented method, comprising: receiving, a plurality of micro services designs of a plurality of applications pertaining to one or more technologies for one or more domains; modelling, by using a plurality of component modelers, at least a set of user interface components and one or more domain components that are created and configured based on the plurality of micro services designs of the plurality of applications. In an embodiment, the one or more domain components includes persistent classes, data transfer objects, validator classes, services, controllers, queries, entities, and exceptions. The processor implemented method further comprising validating, using a plurality of model validators, design consistency of the one or more modeled domain components based on a plurality of rules associated with the plurality of micro services designs of the plurality of applications; generating, using one or more code generators, at least (i) a plurality of codes implementing a plurality of functional logics and (ii) a plurality of configurations files, for the plurality of micro services designs of the plurality of applications, wherein the plurality of codes are generated according to the one or more modeled domain components of the micro services designs of the plurality of applications satisfying one or more requirements of the plurality of applications. In an embodiment, the plurality of generated codes are used for defining and fetching user workspace for a plurality of users. The processor implemented method further comprising deriving, using a plurality of code editors, a plurality of custom codes by customizing the generated plurality of codes based on one or more conditions of the one or more technologies for the one or more domains recommended for the plurality of applications; validating, using a plurality of code validators, the plurality of custom codes for the plurality of micro services designs of the plurality of applications by validating the plurality of functional logics of the plurality of custom codes; containerizing, using a deployment modeler, the plurality of validated custom codes for the plurality of micro services designs of the plurality of applications to obtain a plurality of containerized applications; and deploying, the plurality of containerized applications for the plurality of micro services designs into a target deployment environment for execution using the plurality of configuration files.

In another aspect, there is provided a system comprising: a memory storing instructions; one or more communication interfaces; and one or more hardware processors coupled to the memory through the one or more communication interfaces, wherein the one or more hardware processors are configured by the instructions to: receive, a plurality of micro services designs of a plurality of applications pertaining to one or more technologies for one or more domains; model, by using a plurality of component modelers, at least a set of user interface components and one or more domain components that are created and configured based on the plurality of micro services designs of the plurality of applications. In an embodiment, the one or more domain components includes persistent classes, data transfer objects, validator classes, services, controllers queries, entities, and exceptions. The one or more hardware processors are further configured by the instructions to validate, using a plurality of model validators, design consistency of the one or more modeled domain components based on a plurality of rules associated with the plurality of micro services designs of the plurality of applications; generate, using one or more code generators, at least (i) a plurality of codes implementing a plurality of functional logics and (ii) a plurality of configurations files, for the plurality of micro services designs of the plurality of applications, wherein the plurality of codes are generated according to the one or more modeled domain components of the micro services designs of the plurality of applications satisfying one or more requirements of the plurality of applications. In an embodiment, the plurality of generated codes are used for defining and fetching user workspace for a plurality of users. The one or more hardware processors are further configured by the instructions to derive, using a plurality of code editors, a plurality of custom codes by customizing the generated plurality of codes based on one or more conditions of the one or more technologies for the one or more domains recommended for the plurality of applications; validate, using a plurality of code validators, the plurality of custom codes for the plurality of micro services designs of the plurality of applications by validating the plurality of functional logics of the plurality of custom codes; containerize, using a deployment modeler, the plurality of validated custom codes for the plurality of micro services designs of the plurality of applications to obtain a plurality of containerized applications; and deploy, the plurality of containerized applications for the plurality of micro services designs into a target deployment environment for execution using the plurality of configuration files.

In yet another aspect, there are provided one or more non-transitory machine readable information storage mediums comprising one or more instructions which when executed by one or more hardware processors cause: receiving, a plurality of micro services designs of a plurality of applications pertaining to one or more technologies for one or more domains; modelling, by using a plurality of component modelers, at least a set of user interface components and one or more domain components that are created and configured based on the plurality of micro services designs of the plurality of applications. In an embodiment, the one or more domain components includes persistent classes, data transfer objects, validator classes, services, controllers queries, entities, and exceptions. The one or more instructions when executed by one or more hardware processors further cause validating, using a plurality of model validators, design consistency of the one or more modeled domain components based on a plurality of rules associated with the plurality of micro services designs of the plurality of applications; generating, using one or more code generators, at least (i) a plurality of codes implementing a plurality of functional logics and (ii) a plurality of configurations files, for the plurality of micro services designs of the plurality of applications, wherein the plurality of codes are generated according to the one or more modeled domain components of the micro services designs of the plurality of applications satisfying one or more requirements of the plurality of applications. In an embodiment, the plurality of generated codes are used for defining and fetching user workspace for a plurality of users. The one or more instructions when executed by one or more hardware processors further cause deriving, using a plurality of code editors, a plurality of custom codes by customizing the generated plurality of codes based on one or more conditions of the one or more technologies for the one or more domains recommended for the plurality of applications; validating, using a plurality of code validators, the plurality of custom codes for the plurality of micro services designs of the plurality of applications by validating the plurality of functional logics of the plurality of custom codes; containerizing, using a deployment modeler, the plurality of validated custom codes for the plurality of micro services designs of the plurality of applications to obtain a plurality of containerized applications; and deploying, the plurality of containerized applications for the plurality of micro services designs into a target deployment environment for execution using the plurality of configuration files.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a model driven system and method for development of micro service applications. The typical interpretation of results obtained from conventional application development methods has been modified for optimization of application development process. The method of present disclosure provides a model driven integrated framework for building a model of a plurality of distributed components of a plurality of micro service applications that cater to changing requirements of the plurality of micro service applications in accordance with the upcoming technologies. The plurality of distributed components comprise a plurality of component modelers, a plurality of model validators, one or more code generators, a plurality of code editors, a plurality of code validators, deployment modelers, and the like. The plurality of distributed components are used to provide an environment to model, generate code, develop, unit test, assemble, and deploy the plurality of applications. The generated codes address cross-cutting concerns such as code quality, logging, auditing, transaction management, client server communication, event-management, database management and the like. The model driven integrated framework also encompasses an integrated unit testing framework for functional testing of services. Further, deployable such as EAR file or WAR file or JAR file based on users choice can then be generated from the generated/developed code automatically.

Figure 1:
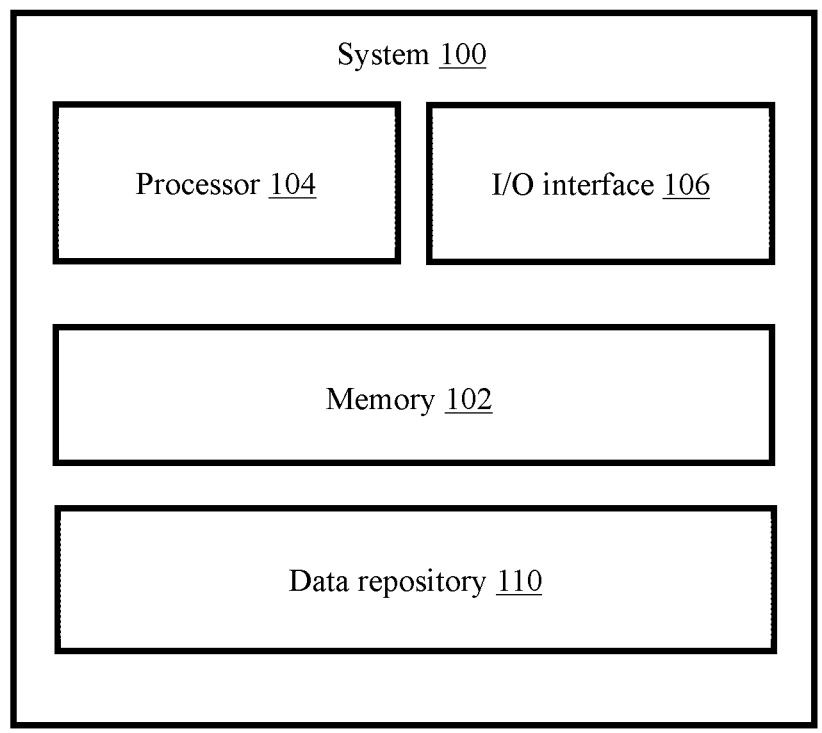
FIG. 1 illustrates an exemplary block diagram of a model driven system for development of micro service applications, in accordance with an embodiment of the present disclosure.
Figure 2:
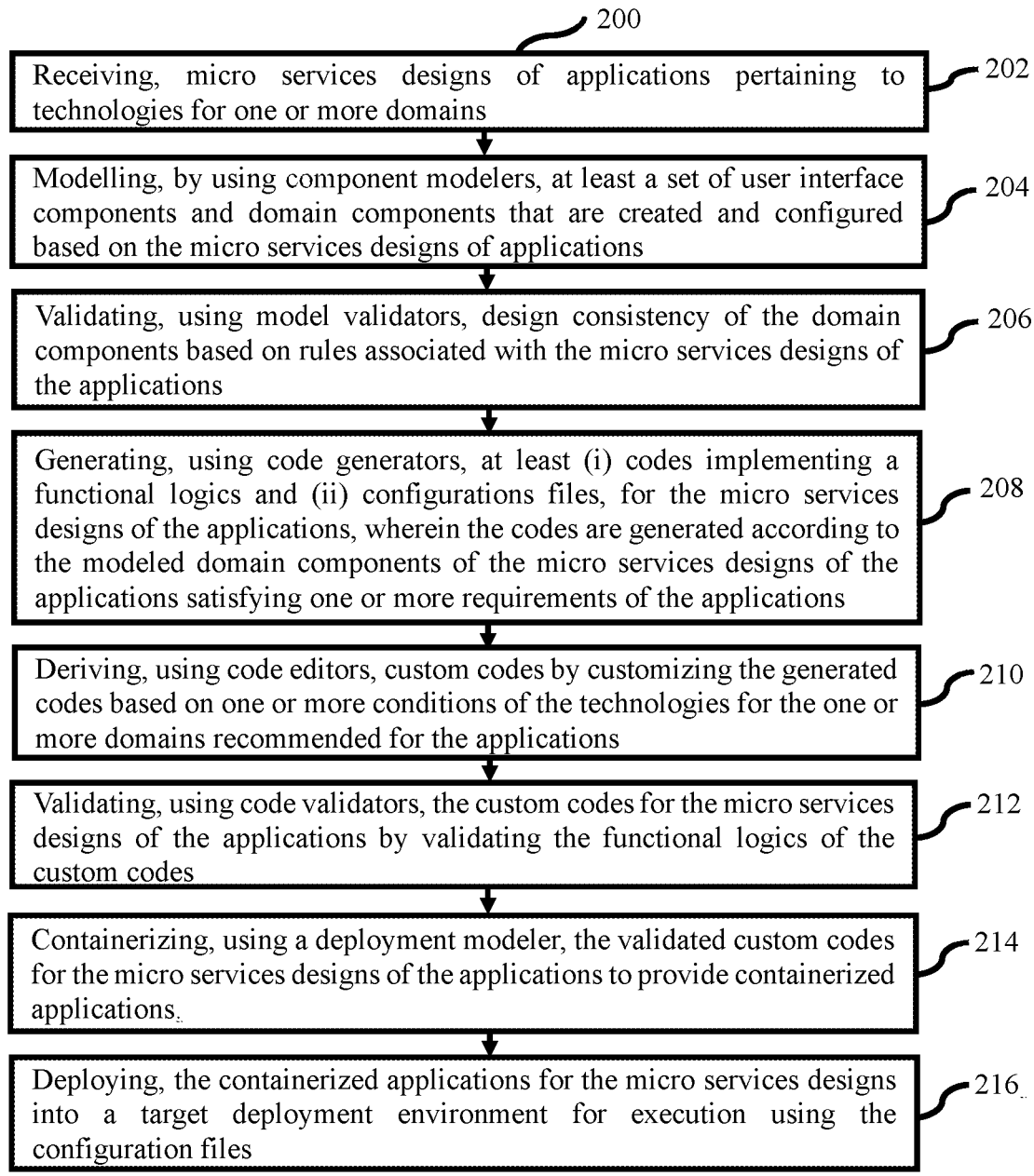
FIG. 2 illustrate an exemplary flow diagram of a model driven method for development of micro service applications using the system of FIG. 1, in accordance with an embodiment of the present disclosure.
Figure 3:
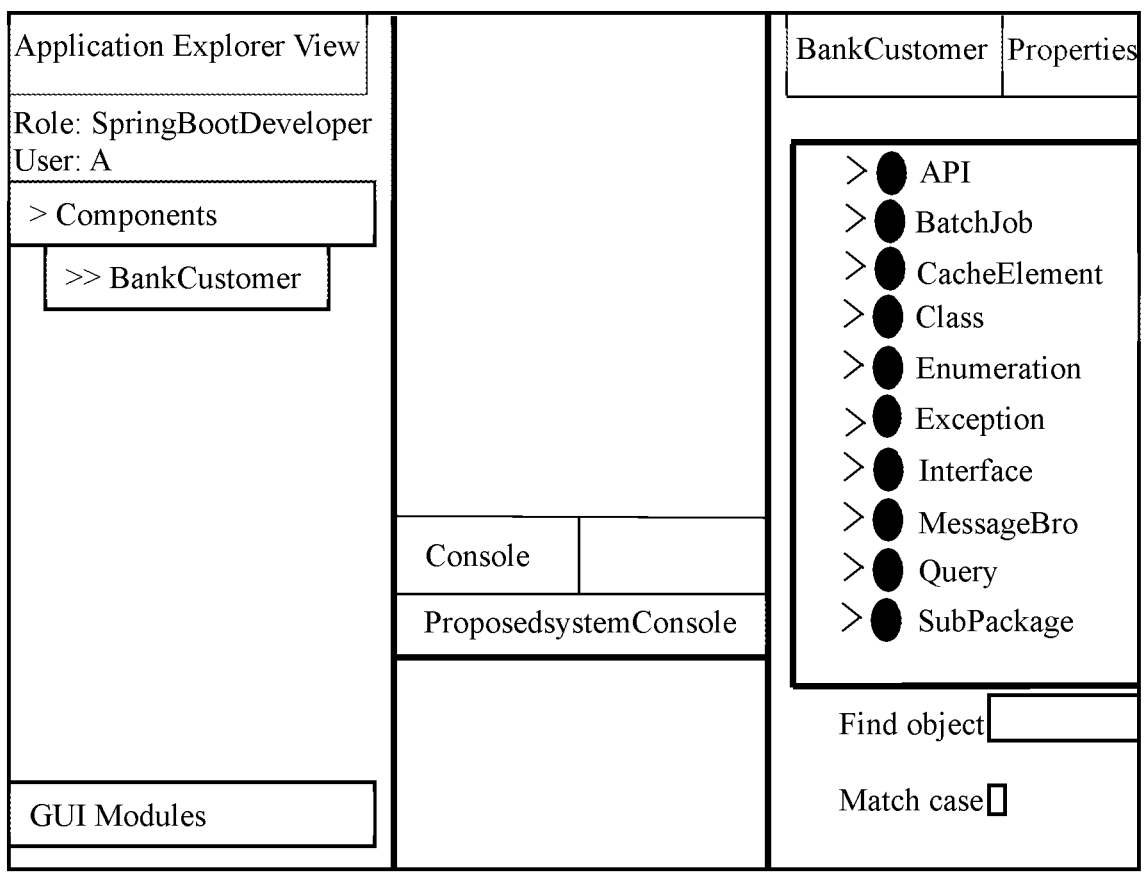
FIG. 3 depicts a domain component modeler illustrating an example of a model driven system for development of micro service applications, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 illustrates an exemplary block diagram of a model driven system 100 (hereinafter referred as system 100 throughout the description) for development of micro service applications, in accordance with an embodiment of the present disclosure.

In an embodiment, the system 100 includes processor (s) 104, communication interface device(s), alternatively referred as or input/output (I/O) interface(s) 106, and one or more data storage devices or memory 102 operatively coupled to the processor (s) 104. The processor (s), alternatively referred as one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, component modelers, model validators, code generators, code editors, code validators, deployment modelers, and/or any devices that manipulate signals/inputs based on operational instructions. In an embodiment, the component modelers, the model validators, the code generators, the code editors, the code validators, and the deployment modelers could be used as standalone units. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106, through the ports can be configured to receive inputs stored external to the system 100.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 102 can include a plurality of models, a plurality of component modelers, a plurality of model validators, one or more code generators, a plurality of code editors, a plurality of code validators, and a deployment modeler that can be implemented by the processor 104 to perform actions according to the embodiments of the present disclosure. In an embodiment, the memory 102 includes a data repository 110 for storing data processed, received, and generated as output(s) by the system 100. The plurality of component modelers, the plurality of model validators, the one or more code generators, the plurality of code editors, the plurality of code validators, and the deployment modeler stored in the memory 102 may include routines, programs, objects, components, data structures, and so on, which perform particular tasks or implement particular (abstract) data types.

The data repository 110, amongst other things, includes a system database and other data. In an embodiment, the data repository 110 may be external (not shown) to the system 100 and accessed through the I/O interfaces 106. The memory 102 may further comprise information pertaining to input(s)/output(s) of each step performed by the processor 104 of the system 100 and methods of the present disclosure. In an embodiment, the system database may store information not limited to, micro services designs, domain components, user interface components, a plurality of rules, generated and custom codes, functional logics, configuration files, validators, packaged applications and the like. Further, the system database stores information pertaining to inputs fed to the system 100 and/or outputs generated by the system (e.g., at each stage), specific to the methodology described herein. More specifically, the system database stores information being processed at each step of the proposed methodology. The other data may include, data generated as a result of the execution of the plurality of component modelers, the plurality of model validators, the one or more code generators, the plurality of code editors, the plurality of code validators, and the deployment modeler stored in the memory 102. The generated data may be further learnt to provide improved learning in the next iterations to output desired results with improved accuracy.

In an embodiment, the one or more hardware processors 206 can be configured to perform a model driven method for development of micro service applications, which can be carried out by using methodology, described in conjunction with FIG. 2, and use case examples.

FIG. 2 illustrate an exemplary flow diagram of a model driven method for development of micro service applications using the system of FIG. 1, in accordance with an embodiment of the present disclosure. In an embodiment, the system 100 comprises one or more data storage devices or the memory 102 operatively coupled to the one or more processors 104 and is configured to store instructions for execution of steps of the method 200 by the one or more processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200 depicted in FIG. 2, in an embodiment of the present disclosure, at step 202, the one or more hardware processors are configured to receive, a plurality of micro services designs of a plurality of applications pertaining to one or more technologies for one or more domains. Here, micro services refer to a cohesive set of functional services for a specific domain and micro services designs refer to architectural style for developing and deploying applications. In an example embodiment, the plurality of applications may comprise but not limited to a software application, program, library, module, or portion of a larger, multi-tiered software system. Here the one or more domains may include but are not limited to a banking domain, an insurance domain, a retail domain, an aerospace domain, and the like. Further, the one or more technologies may include but are not limited to maven, gradle, object oriented technology, and the like.

Further, at step 204 of the method 200 as depicted in FIG. 2, a plurality of component modelers implemented by the one or more processors 104 are configured to model, at least a set of user interface components and one or more domain components that are created and configured based on the plurality of micro services designs of the plurality of applications. In an embodiment, the plurality of component modelers include a domain component modeler and a user interface modeler. In an embodiment, a model refers to a technology agnostic representation of a system design. Further, the model contains model elements that form an application or a plurality of application components including but not limited to services, classes, attributes, queries, user interface screens, fields inside screens and relationships between the plurality of application components in a technology agnostic manner. In an embodiment, the step of modeling involves creation of the model elements, defining properties of the model elements and relationships between them. In an example embodiment, properties of the model element (e.g., 'IsPersistent for Classes') define characteristics of the model elements and relationships (e.g., 'hasInput for Queries') link the model elements with each other. In an embodiment, the model elements are categorized as a set of user interface components and one or more domain components. In an embodiment, the one or more domain components are modeled using a plurality of domain component modelers and can be used to generate a service layer code, wherein service layer represents backend of the plurality of applications. FIG. 3 depicts a domain component modeler illustrating an example of a model driven system for development of micro service applications, in accordance with an embodiment of the present disclosure. Further, the one or more domain components may include but are not limited to classes including Persistent classes and validator classes, data transfer objects (DTOs), services, controllers, exceptions, queries, entities, and the like. In an example embodiment, under a class element, one pre-created 'SpringBoot-Application' class with name {ComponentName} application may appear. For example, as depicted in FIG. 3, if the component name is 'BankCustomer', a class entry 'BankCustomerApplication' may appear under the class element. In an embodiment, the set of user interface components including but not limited to screens, fields inside screens, panels, user-defined controls, and user-defined panels can be used to generate user interface layer code. Here, the user interface layer code could be a hypertext text markup language (HTML) code or a java script code. In an embodiment, the set of user interface components are modeled using the plurality of user interface modelers.

Referring back to FIG. 2, at step 206 of the method 200, a plurality of model validators implemented by the one or more hardware processors 104 are configured to validate design consistency of the one or more domain components based on a plurality of rules associated with the plurality of micro services designs of the plurality of applications. In an embodiment, the validation step involves running a plurality of rules on a specified model. Further, the design consistency of the one or more domain components is validated for system to ensure that all of the plurality of rules associated with the plurality of micro services designs of the plurality of applications are adhered to. For example, in a domain component, a class is modeled as a Data Access Object by setting a property IsPersistent to "yes". Then, it should map to an Entity in a database layer. So, a primary key must be mandatorily created and associated to the class. When this class is validated, a rule is checked, wherein the rule is 'if this class which is a Data Access Object has a primary key associated to it or not'. If the rule is not satisfied, then an error is shown by the system 100 and validation fails. In an embodiment, other non-limiting examples of the plurality of rules are (i) 'a class element should implement all methods defined in parent interface', (ii) 'attribute visibility inside persistent class should be private'.

Referring to step 208 of the method 200 as depicted in FIG. 2, one or more code generators implemented by the one or more hardware processors 104 are configured to generate, at least (i) a plurality of codes implementing a plurality of functional logics and (ii) a plurality of configurations files, for the plurality of micro services designs of the plurality of applications. In an embodiment, the plurality of codes are generated according to the one or more modeled domain components of the micro services designs of the plurality of applications satisfying one or more requirements of the plurality of applications. In an embodiment, the one or more requirements could be but are not limited to requirement of new screen (user interface) for creating a customer and updating customer, and requirement of new services for creating a new customer and updating customer. In an embodiment, the plurality of generated codes are used for defining and fetching user workspace for a plurality of users. Here, the plurality of users could be developers. For example, if a user from the plurality of users has a specified Customer class with one or more attributes, then a java file gets generated with file name as Customer.java and the one or more attributes are generated with their data types along with pre-defined operations. In an embodiment, the one or more attributes may include but not limited to customer id, customer age, customer date of birth (DOB), customer name. The step of code generation is further explained by way of a non-limiting example for spring boot technology in java. Here, for a first class element which is modeled as a Data Access Object, a java class file gets generated. Further, inside the java class file, a class declaration gets generated with (i) a set of JPA imports, (ii) a set of class-level Annotations (e.g., @Entity, @Table, @Getter, @Setter, @XmlRootElement, @XmlAccessorType, @JsonIdentity-Info), and (iii) a set of implements clause with a JPA interface. For each attribute modeled in the class element, attribute declaration with modeled data type, and attribute-level annotations gets generated. For a set of attributes marked as primary key, an additional annotation gets generated. In addition to annotations, comments and inline documentation placeholders get generated. A sample of the generated java file is depicted in code provided below as:

```
@Entity
@Table(name = "customertbl")
@Getter
@Setter
@XmlRootElement
@XmlAccessorType(XmlAccessType.FIELD)
@JsonIdentityInfo(generator=ObjectIdGenerators.UUIDGenerator.class,
property="@jsonObjectId")
// START_USER_CODE USER_REQUIRED_ANNOTATIONS
// END_USER_CODE USER_REQUIRED_ANNOTATIONS
public class Customer{
    @Id
    @Column( name = "customerId" , nullable = false )
    //START_USER_CODE
```

```
USER_REQUIRED_ATTRIBUTE_ANNOTATIONS_c37ddb2e07283003-
e3bd5c66cc471f1c
//END_USER_CODE
USER_REQUIRED_ATTRIBUTE_ANNOTATIONS_c37ddb2e07283003-
e3bd5c66cc471f1c
private Integer customerId;
@Column( name = "customerName" )
@Size(min=0, max=256)
//START_USER_CODE
USER_REQUIRED_ATTRIBUTE_ANNOTATIONS_7b94ccaf4422272e-
1c95fd6c601ac0a6
//END_USER_CODE
USER_REQUIRED_ATTRIBUTE_ANNOTATIONS_7b94ccaf4422272e-
1c95fd6c601ac0a6
private String customerName;
@Column( name = "customerDOB" )
//START_USER_CODE
USER_REQUIRED_ATTRIBUTE_ANNOTATIONS_157ea16e72bece30-
4b1a387d5490d9c7
//END_USER_CODE
USER_REQUIRED_ATTRIBUTE_ANNOTATIONS_157ea16e72bece30-
4b1a387d5490d9c7
private LocalDate customerDOB;
@Column( name = "customerAge" )
@Min(value=0)
@Digits(integer=9, fraction = 0)
//START_USER_CODE
USER_REQUIRED_ATTRIBUTE_ANNOTATIONS_a43d05a25ec4b1ec-
f7b9a5423eca48aa
//END_USER_CODE
USER_REQUIRED_ATTRIBUTE_ANNOTATIONS_a43d05a25ec4b1ec-
f7b9a5423eca48aa
private int customerAge;
@Column( name = "address" )
@Size(min=0, max=256)
//START_USER_CODE
USER_REQUIRED_ATTRIBUTE_ANNOTATIONS_8068499e234ceafa-
4253e8d6cd69cb36
//END_USER_CODE
USER_REQUIRED_ATTRIBUTE_ANNOTATIONS_8068499e234ceafa-
4253e8d6cd69cb36
private String address;
@Version
private Long version;
private LocalDateTime createdOn;
private LocalDateTime modifiedOn;
// START_USER_CODE USER_REQUIRED_ATTRIBUTE
// END_USER_CODE USER_REQUIRED_ATTRIBUTE
@PrePersist
protected void onCreate( ) {
createdOn = LocalDateTime.now( );
}
@PreUpdate
protected void onUpdate( ) {
modifiedOn = LocalDateTime.now( );
}
// START_USER_CODE USER_REQUIRED_OPERATION
// END_USER_CODE USER_REQUIRED_OPERATION
}
```

Customer name, customer id, customer DOB, customer age, customer address, version are the attributes mentioned in the above-mentioned code. As can be seen in above-mentioned code, for each attribute modeled in the class element (e.g., customer class), attribute declaration with modeled data type, and attribute-level annotations gets generated. Further, @PrePersist and @PreUpdate as shown in the above-mentioned code represent the pre-defined operations.

Referring to FIG. 2, at step 210 of the method 200, a plurality of code editors implemented by the one or more hardware processors 104 are configured to derive a plurality of custom codes by customizing the generated plurality of codes based on one or more conditions of the one or more domain technologies for one or more domains recommended for the plurality of applications. In an embodiment, a non-limiting example of the one or more conditions is 'if technology is selected as Xtype, then the generated code is customized as per selected technology and selected stack.' Further, referring back to the above-mentioned example for spring boot technology in java, a second class element is considered which is modeled as Data Transfer Object by setting IsMessageType property of the second class element to "yes". However, generation of class files for the second class element is different from the first class element considered in the above-mentioned example. Here, inside the generated class files for the second class element, the inline documentation placeholders get generated at different sections of the code. This can be explained with the help of pseudo code provided below as:

```
Class Customer {
    Import xxx;
    Import yyyy;
Start_USER_IMPORTS
    ....
END_USER_IMPORTS
            Int aatr1;
            String atr2;
START_USER_ATTR
    ...
END_USER_ATTR
    ...
}
```

As can be seen in above-mentioned pseudo code, the inline documentation placeholders imports and attributes are generated at different sections of the code. In a similar way, for different types of model elements such as interfaces, exceptions, service classes, queries, and the like, different type of code files get generated. In such cases, functional logics of the plurality of generated codes are customized for implementing required functionality inside the generated class files in the same technology in which the plurality of codes are generated.

Further, at step 212 of the method 200 as depicted in FIG. 2, a plurality of code validators implemented by the one or more hardware processors 104 are configured to validate, the plurality of custom codes for the plurality of micro services designs of the plurality of applications by validating the plurality of functional logics of the plurality of custom codes. In an embodiment, once a code is developed, it must be syntactically corrected to ensure successful compilation. Thus, when the plurality of custom codes are developed, the plurality of code validators constantly check if the plurality of developed custom codes are syntactically correct. When any of the custom code from the plurality of developed custom codes are found syntactically incorrect, then that custom code is marked as erroneous code and any attempt to compile the erroneous code fails. For example, in a java editor, if an expression is typed inside logic section without a semi-colon, a syntax error is marked for that line of code. In an embodiment, compile action is specific to technology and run on the plurality of generated codes and the plurality of custom codes.

Furthermore, at step 214 of the method 200 as depicted in FIG. 2, a deployment modeler implemented by the one or more hardware processors 104 is configured to containerize, the plurality of validated custom codes for the plurality of micro services designs of the plurality of applications to provide a plurality of containerized applications (e.g., alternatively referred as packaged applications). In an embodiment, traditional methods of containerization require users to run a custom command or custom script. Also, the traditional methods require different types of containerization for different domain components and user-interface components. However, the present disclosure overcomes the limitations of the traditional methods of containerization, wherein user interface of the system of present disclosure provides an action which, when selected by the developer, opens an editor to configure different options for containerization. In an embodiment, the action could be providing an automated process after enabling the plurality of code editors to capture data related to manual steps. In an embodiment, the data related to manual steps include configuration of parameters such as log file path, database details, docker registry certificates and the like. Further, based on such actions, a build script is run for compiling and containerizing the application in the required containerizing format as configured by the user. For example, the system of the present disclosure allows the plurality of applications to be containerized separately or combined together into an executable .jar file, a deployable .war file or a docker image.

Referring back to FIG. 2, at step 216 of the method 200, the one or more hardware processors 104 are configured to deploy the plurality of containerized applications for the plurality of micro services designs into a target deployment environment for execution using the plurality of configuration files. Here, the plurality of configuration files may include but are not limited to a log patch, user-defined link (url) of host, menu details, and the like. In an embodiment, once containerization is successful, the system of the present disclosure provides an action which when selected by the user automatically deploys the plurality of containerized application into a target deployment environment such as a cloud platform.

The method of the present disclosure provides optimization of application development process in an automated manner by reducing development cost and overcome delays in setting up the software applications. Further, the present disclosure provides a system to cater to the requirements of changing technologies and enables customization of codes.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
receiving, a plurality of micro services designs of a plurality of applications pertaining to one or more technologies for one or more domains;
modelling, by using a plurality of component modelers, at least a set of user interface components and one or more domain components that are created and configured based on the plurality of micro services designs of the plurality of applications, wherein the modeled set of user interface components and the one or more modeled domain components accommodate to changing requirements of the plurality of micro services designs of the plurality of applications pertaining to the one or more technologies;
validating, using a plurality of model validators, design consistency of the one or more modeled domain components based on a plurality of rules associated with the plurality of micro services designs of the plurality of applications, wherein the one or more domain components are modeled using a plurality of domain component modelers, the plurality of domain component modelers generate a service layer code, and wherein the service layer code represents backend of the plurality of applications;
generating, using one or more code generators, at least (i) a plurality of codes implementing a plurality of functional logics and (ii) a plurality of configuration files, for the plurality of micro services designs of the plurality of applications, wherein the plurality of codes are generated according to the one or more modeled domain components of the micro services designs of the plurality of applications satisfying one or more requirements of the plurality of applications;
deriving, using a plurality of code editors, a plurality of custom codes by customizing the generated plurality of codes based on one or more conditions of the one or more technologies for the one or more domains recommended for the plurality of applications;
validating, using a plurality of code validators, the plurality of custom codes for the plurality of micro services designs of the plurality of applications by validating the plurality of functional logics of the plurality of custom codes;
containerizing, using a deployment modeler, the plurality of validated custom codes for the plurality of micro services designs of the plurality of applications to obtain a plurality of containerized applications wherein a user interface provides an action which when selected by a user, opens an editor to configure one or more options for containerization and wherein based on the selected action, a build script is run for compiling and containerizing the plurality of validated custom codes in required containerizing format; and
deploying, the plurality of containerized applications for the plurality of micro services designs into a target deployment environment for execution using the plurality of configuration files.

2. The method of claim 1, wherein the one or more domain components includes persistent classes, data transfer objects, validator classes, services, controllers, queries, entities, and exceptions.

3. The method of claim 1, wherein the plurality of generated codes are used for defining and fetching user workspace for a plurality of users.

4. A system, comprising:
a memory;
one or more communication interfaces;
one or more hardware processors coupled to said memory through said one or more communication interfaces, wherein said one or more hardware processors are configured to:
receive, a plurality of micro services designs of a plurality of applications pertaining to one or more technologies for one or more domains;
model, by using a plurality of component modelers, at least a set of user interface components and one or more domain components that are created and configured based on the plurality of micro services designs of the plurality of applications, wherein the modeled set of user interface components and the one or more modeled domain components accommodate to changing requirements of the plurality of micro services designs of the plurality of applications pertaining to the one or more technologies;
validate, using a plurality of model validators, design consistency of the one or more modeled domain components based on a plurality of rules associated with the plurality of micro services designs of the plurality of applications, wherein the one or more domain components are modeled using a plurality of domain component modelers, the plurality of domain component modelers generate a service layer code, and wherein the service layer code represents backend of the plurality of applications;

generate, using one or more code generators, at least (i) a plurality of codes implementing a plurality of functional logics and (ii) a plurality of configurations files, for the plurality of micro services designs of the plurality of applications, wherein the plurality of codes are generated according to the one or more modeled domain components of the micro services designs of the plurality of applications satisfying one or more requirements of the plurality of applications;

derive, using a plurality of code editors, a plurality of custom codes by customizing the generated plurality of codes based on one or more conditions of the one or more technologies for the one or more domains recommended for the plurality of applications;

validate, using a plurality of code validators, the plurality of custom codes for the plurality of micro services designs of the plurality of applications by validating the plurality of functional logics of the plurality of custom codes;

containerize, using a deployment modeler, the plurality of validated custom codes for the plurality of micro services designs of the plurality of applications to obtain a plurality of containerized applications, wherein a user interface provides an action which when selected by a user, opens an editor to configure one or more options for containerization and wherein based on the selected action, a build script is run for compiling and containerizing the plurality of validated custom codes in required containerizing format; and deploy, the plurality of containerized applications for the plurality of micro services designs into a target deployment environment for execution using the plurality of configuration files.

5. The system of claim 4, wherein the one or more domain components includes persistent classes, data transfer objects, validator classes, services, controllers, queries, entities, and exceptions.

6. The system of claim 4, wherein the plurality of generated codes are used for defining and fetching user workspace for a plurality of users.

7. One or more non-transitory machine-readable information storage mediums comprising one or more instructions which when executed by one or more hardware processors cause:

receiving, a plurality of micro services designs of a plurality of applications pertaining to one or more technologies for one or more domains;

modelling, by using a plurality of component modelers, at least a set of user interface components and one or more domain components that are created and configured based on the plurality of micro services designs of the plurality of applications;

validating, using a plurality of model validators, design consistency of the one or more modeled domain components based on a plurality of rules associated with the plurality of micro services designs of the plurality of applications, wherein the one or more domain components are modeled using a plurality of domain component modelers, the plurality of domain component modelers are used generate a service layer code, and wherein the service layer code represents backend of the plurality of applications, wherein the modeled set of user interface components and the one or more modeled domain components accommodate to changing requirements of the plurality of micro services designs of the plurality of applications pertaining to the one or more technologies;

generating, using one or more code generators, at least (i) a plurality of codes implementing a plurality of functional logics and (ii) a plurality of configurations files, for the plurality of micro services designs of the plurality of applications, wherein the plurality of codes are generated according to the one or more modeled domain components of the micro services designs of the plurality of applications satisfying one or more requirements of the plurality of applications;

deriving, using a plurality of code editors, a plurality of custom codes by customizing the generated plurality of codes based on one or more conditions of the one or more technologies for the one or more domains recommended for the plurality of applications;

validating, using a plurality of code validators, the plurality of custom codes for the plurality of micro services designs of the plurality of applications by validating the plurality of functional logics of the plurality of custom codes;

containerizing, using a deployment modeler, the plurality of validated custom codes for the plurality of micro services designs of the plurality of applications to obtain a plurality of containerized applications, wherein a user interface provides an action which when selected by a user, opens an editor to configure one or more options for containerization and wherein based on the selected action, a build script is run for compiling and containerizing the plurality of validated custom codes in required containerizing format; and deploying, the plurality of containerized applications for the plurality of micro services designs into a target deployment environment for execution using the plurality of configuration files.

8. The one or more non-transitory machine-readable information storage mediums of claim 7, wherein the one or more domain components includes persistent classes, data transfer objects, validator classes, services, controllers, queries, entities, and exceptions.

9. The one or more non-transitory machine-readable information storage mediums of claim 7, wherein the plurality of generated codes are used for defining and fetching user workspace for a plurality of users.

* * * * *